Jan. 13, 1970  R. STAMMBACH  3,488,986
METHOD OF ROUGHING STRUCTURAL GREAT-WIDTH BEAMS
Filed Aug. 7, 1967  7 Sheets-Sheet 1
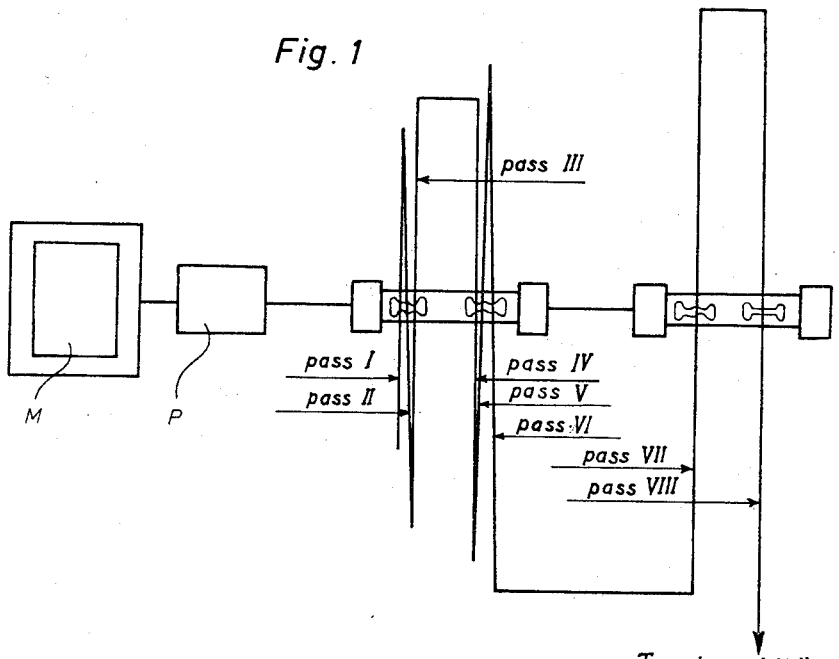
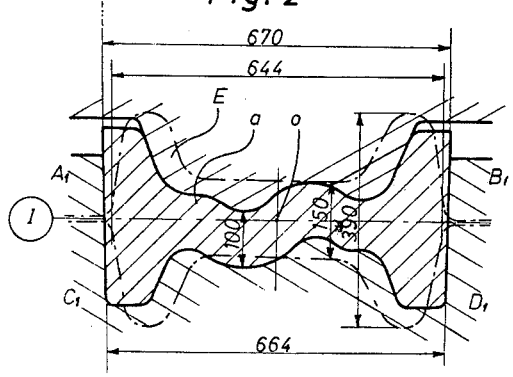
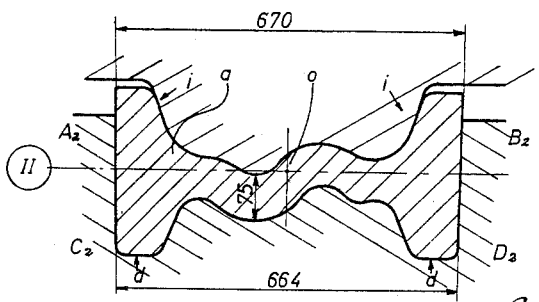
Raymond Stammbach, Inventor
By Wendroth, Lind & Ponack, Attys.

Raymond Stammbach, Inventor

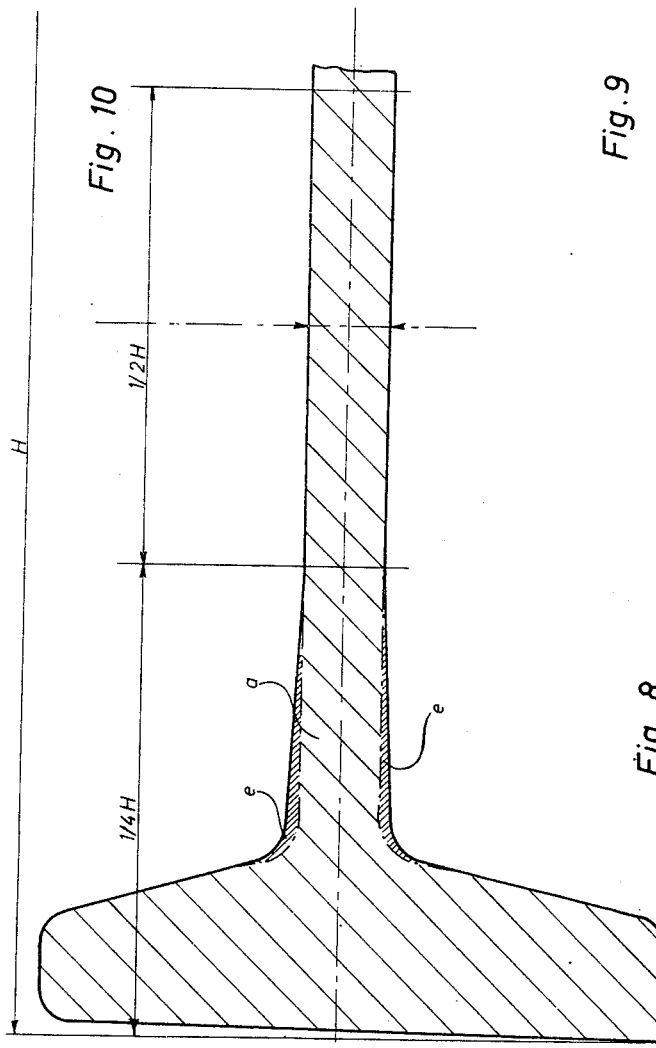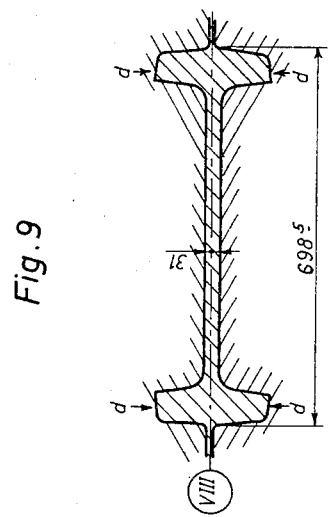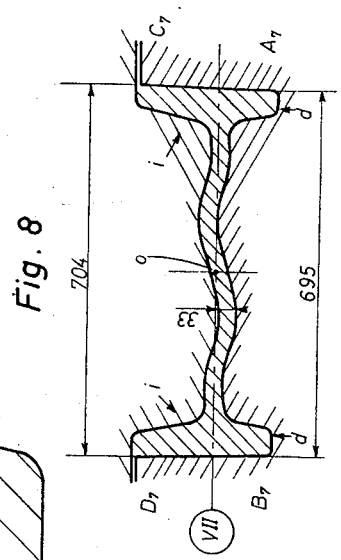

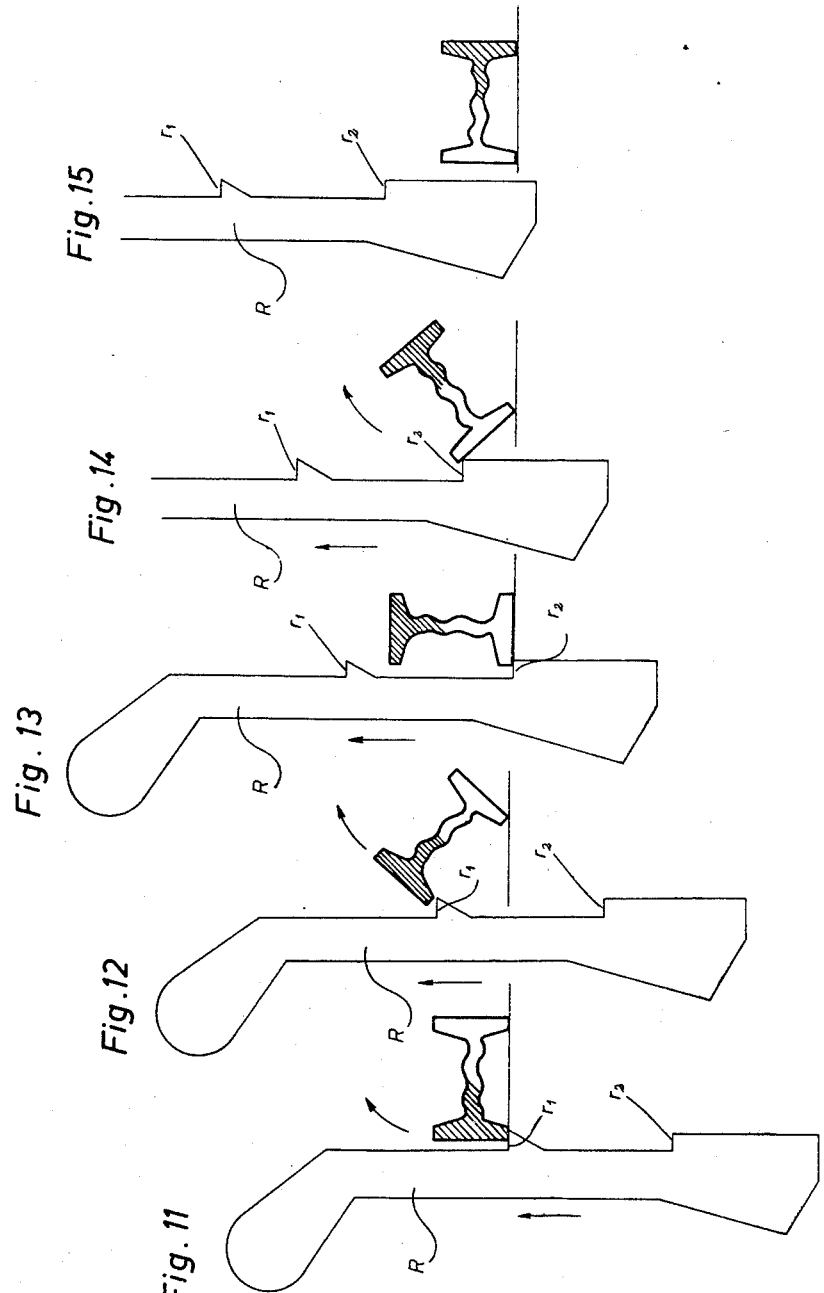

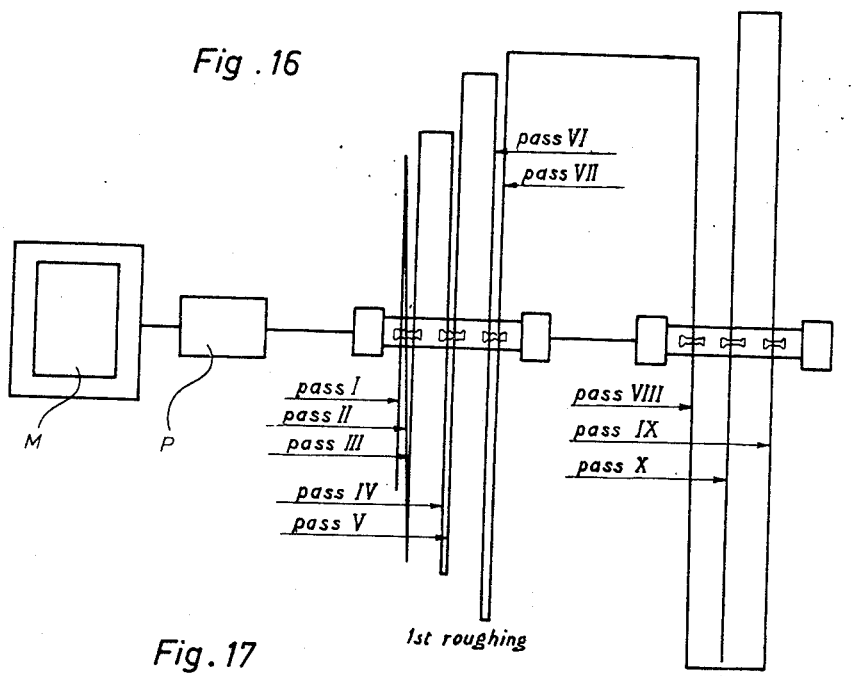
Fig. 16
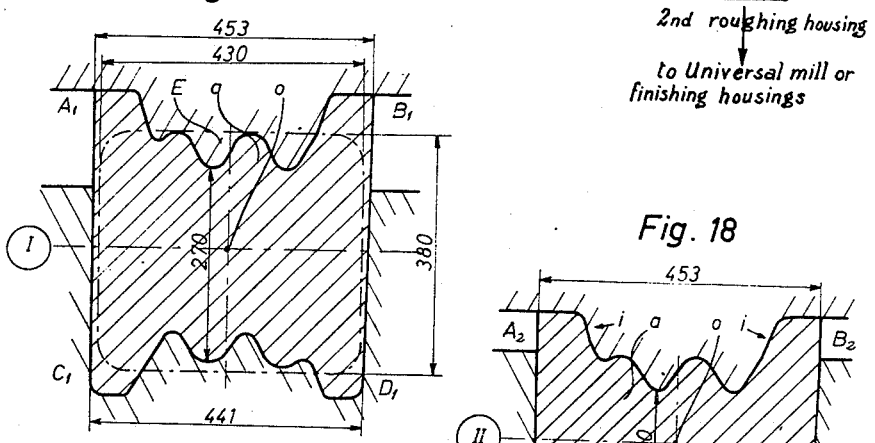
Fig. 17
Fig. 18
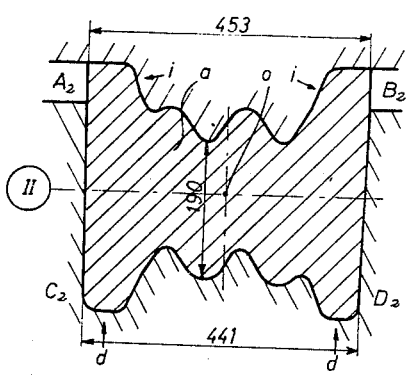
Fig. 19
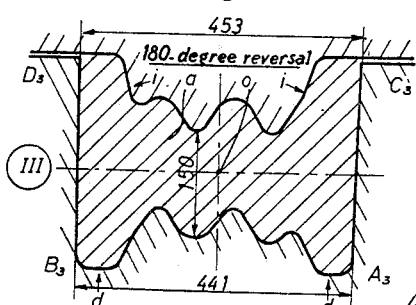

Jan. 13, 1970  R. STAMMBACH  3,488,986
METHOD OF ROUGHING STRUCTURAL GREAT-WIDTH BEAMS
Filed Aug. 7, 1967  7 Sheets-Sheet 6

Raymond Stammbach,
Inventor
By, Wenderoth, Lind & Ponack,
attys.

United States Patent Office 3,488,986
Patented Jan. 13, 1970

3,488,986
METHOD OF ROUGHING STRUCTURAL
GREAT-WIDTH BEAMS
Raymond Stammbach, Knutange, Moselle, France, assignor to De Wendel & Cie, Paris, France
Filed Aug. 7, 1967, Ser. No. 658,832
Claims priority, application France, Sept. 8, 1966, 75,682, Patent 1,528,619
Int. Cl. B21b 41/02, 13/08
U.S. Cl. 72—231      5 Claims

ABSTRACT OF THE DISCLOSURE

The roughing passes are made in roll stands having grooves of corrugated contour disposed symmetrically in relation to the axis consisting of the intersection of the horizontal median plane of the beam, which extends at right angles to the flanges, with the vertical median plane extending at right angles to the web, whereby the lateral thrusts are balanced while avoiding undesired over-rolling effects.

---

This invention relates to the roughing of structural beams of great web depth and has specific reference to an improved method of roughing beams of this type.

It is current practice to rough-shape beams of great web depth by using a preparatory stand usually referred to as the breakdown mill having properly-shaped rolls, which requires a great number of passes with turn over, and comprises edging passages giving only a very moderate elongation. This method is obviously attended by a substantial loss of time and more particularly by a loss of heat which must frequently be compensated by reheating in a special furnace disposed between this stand and the finishing mill.

In most cases, 40 or more passes are necessary before the final section is obtained, especially in the case of parallel-flanged beams having a relatively thin web.

On the other hand, the roughing of structural I-beams of great web depth requires the use of rolls of great diameter and considerable barrel length, and also many stands, so that the different successive grooves can be housed therein. To avoid this drawback it was proposed to impart a corrugated contour to the web in order to reduce the depth of the beam blank being roughed and thus spare space on the barrel length of the rolls. This corrugated web is then straightened by making successive passes in other grooves of adequate width. A pattern of this type of alternate joints is described by Trinks in his work "Roll Pass and Design."

Now all mill specialists are aware that such a contorted design of corrugated grooves is a source of transverse reactions tending to move the rolls away from each other, so that thrust-absorbing tapered-roller bearings must be used as in the case of asymmetric roll design, for example in the manufacture of rails. This is attended by the development of considerable frictional efforts involving a great power expenditure and a rapid roll wear.

It is the object of the present invention to avoid these drawbacks.

It is an essential feature of this invention to provide a method of roughing beam blanks of great depth by using grooves having a corrugated contour which are symmetric in relation to the axis consisting of the intersection of the horizontal medium plane of the beam (which extends at right angles to the flanges) with the vertical median plane of the beam (which extends at right angles to the web).

Since the beam blank is turned over about this axis of symmetry the groove contours constantly correspond in shape to those of the beam blank being roughed, even after a second turn over.

Another feature characterising this invention also lies in the fact that the groove design is so selected that the beam blank to be roughed can be passed several times through the same grooves which are gradually approached to each other with due consideration for the rules governing rolling mill operation.

Between two or more of these passages the beam blank is reversed by 180° for example by using a two-hook device to be described presently.

In order to afford a clearer understanding of this invention and of the manner in which the same may be carried out in practice, reference will now be made to the accompanying drawings illustrating diagrammatically by way of example typical forms of embodiment thereof which should not be construed as limiting the scope of the invention since various modifications and variations may be brought thereto without departing from the basic principles of the invention as set forth in the appended claims. In the drawing:

FIGURES 1 to 10 inclusive refer to a first form of embodiment of the invention; FIGURE 1 is a diagrammatic and synoptic illustration of the complete rolling mill installation, from which the so-called preliminary breakdown mill and the finishing mill have been omitted as they are no part of the invention concerned primarily with beam blank roughing stands;

FIGURES 2 to 9 are vertical sections taken on a larger scale along the roll axes; in these figures the successive passes are designated by Roman numerals;

FIGURE 10 illustrates on a larger scale and in cross section a detail of the beam blank during the web widening step;

Figure 26:
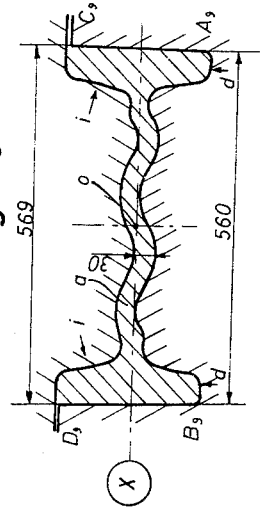
Figure 27:
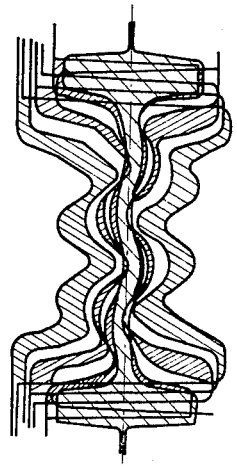

FIGURES 11 to 15 illustrate the beam turning device during the various steps of the turn over procedure; and FIGURES 16 to 27 inclusive relate to a second form of embodiment, FIGURE 16 being a diagrammatic synoptic illustration of the complete rolling mill installation, FIGURES 17 to 26 showing the successive passes numbered I to X in Roman numerals, FIGURE 27 showing the superposition of these passes.

The initial section or preliminary shape E shown in dash-and-dot lines in FIGURE 2 may either be fed from a preparatory stand equipped with suitably grooved rolls, or consist of a rectangular-sectioned bloom as shown in dash-and-dot lines in FIGURE 17 and in this case the bloom is fed from a conventional blooming mill.

Of course, if a rectangular-sectioned bloom is used the number of passes will be considerably greater than in the first case.

The first example described hereinafter refers simply to the rolling of a 600-millimeter IPE beam.

The first stand in which passes I, II, III, IV, V and VI take place (FIGURES 2 to 7) must compulsorily be of the type having screw-down means capable of exerting gradually decreasing elongation in a same groove. The groove contour is symmetric in relation to the point O located (as already explained hereinabove) at the intersection of the vertical and horizontal median planes of the beam blank.

Figure 5:
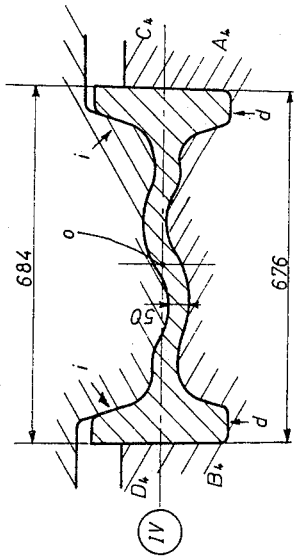
Figure 7:
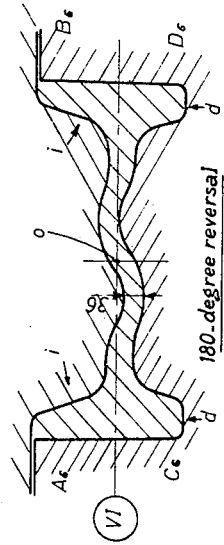
Figure 4:
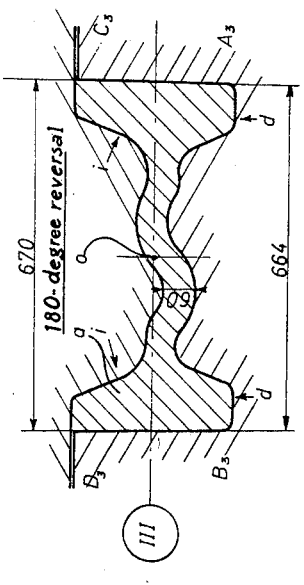
Figure 6:
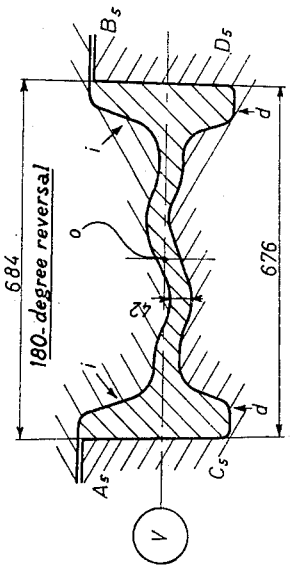
Figure 20:
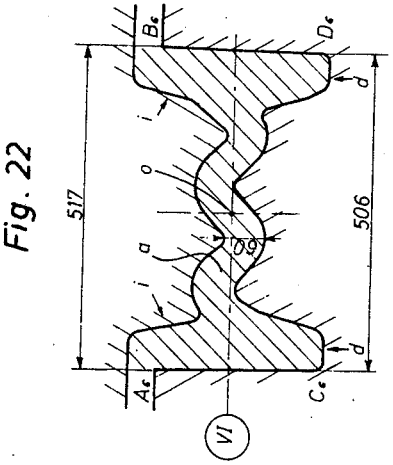
Figure 21:
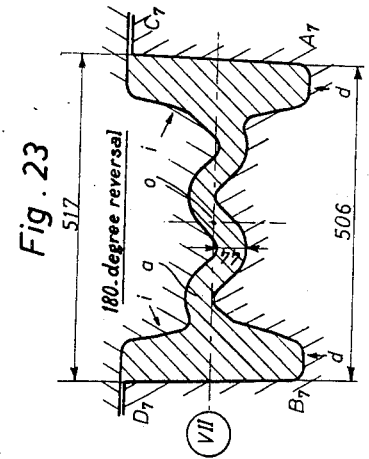
Figure 22:
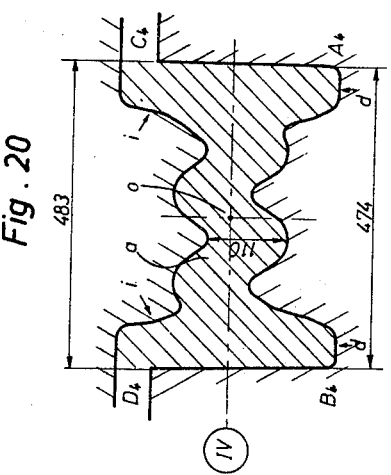
Figure 23:
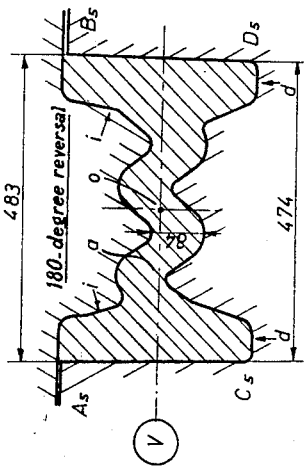

After two successive passages (pass I, FIGURE 2 and pass II, FIGURE 3) the rough shape is turned 180° or turned upside-down about said axes O for making pass IV (FIGURE 3) in order that the flanges be shaped alternatively by direct pressure and indirect pressure, in the direction of the arrows $d$ and $i$. Between the successive passes the rolls are gradually moved towards each other as shown in FIGURES 2, 3 and 4.

After this third pass the beam blank must necessarily be fed through a somewhat wider groove to avoid the exertion of an abnormally high pressure on the lateral portions of the female groove ($A_3$–$C_3$ and $B_3$–$D_3$).

To this end the beam blank $a$ is introduced into the second groove to perform pass IV (FIGURE 5) and the rolling operation is continued after turning the beam blank 180° to bring the upper flanges in the place of the lower flanges. After two passages in this position and the bringing together of the rolls (passes V, FIGURE 6 and VI, FIGURE 7), the beam is again turned 180° and introduced in another groove to permit the widening of the web (pass VII, FIGURE 8).

As the groove corrugations are symmetrical in relation to the axis O of the beam blank cross-section, the contours of the beam blank and of the groove are always superposed after the beam blank has been turned over 180°, thus definitely precluding any risk of over-rolling.

On the other hand, the height of these corrugations decreases gradually from the first groove (passes I, II and III), to the fourth groove (pass VIII, FIGURE 9) to make a straight web. However, this beam blank may still have a slight corrugation if the limited length of the roll barrel does not allow the use of a groove having the desired width.

The beam web widening action may be increased by using the means shown diagrammatically in FIGURE 10.

To this end the roll groove is so designed that the web shaped during the preceding pass has thicker end portions $e$, i.e. where the web merges into the flanges. The length of this gradually decreasing thickening may be for example equal to one-fourth of the total beam depth H. The additional pressure applied to the beam metal along this thicker portion produces an additional web widening since the other portions of the beam cross section prevent the excess thickness from flowing in the longitudinal direction.

The beam blank may be turned 180° by using the device illustrated diagrammatically in FIGURES 11 to 15. This device consists of one or a plurality of vertically movable hooks R comprising each two aligned catches $r_1$ and $r_2$. To carry out the desired turning movement these hooks are raised in proper time relationship whereby the upper catch $r_1$ engages the lower edge of the adjacent flange (FIGURE 11) and lifts same (FIGURE 12), to a vertical position (FIGURE 13) so that the opposite or lower flanges lies upon the lower catch $r_2$. This catch, by continuing upward movement of the hook R, tilts the beam blank to the position shown in FIGURE 15 which is turned by 180 degrees with respect to the position shown in FIGURE 11. Thus, the beam blank is turned by a same and single movement, without any loss of time.

In the installation synoptic diagram shown by way of example in FIGURE 1 the reference letter M designates the reversible motor driving through a gear box P the first and second roughing stands referred to hereinabove.

The second exemplary form of embodiment of this invention, which is illustrated in FIGURES 16 to 26 inclusive of the attached drawings, is intended for roughing 500-mm. beams.

In these figures the various elements are designated by the same reference symbols as in the figures concerning the first form of embodiment.

FIGURES 17 to 26 illustrate diagrammatically the successive contours of the different sequential passes.

FIGURE 27 shows the superposed contours of the corrugated grooves.

The passes are also denoted by Roman numerals.

According to the space available on the roll barrel the web may be given several corrugations, provided however that the groove contours remains constantly symmetric to the above-defined axis O. Thus, after successive turning over the corrugations are perfectly superposed without any risk of over-rolling, and lateral thrusts are safely balanced.

The sequence of operations differs slightly from that of the preceding example.

In fact, firstly two passes I and II (FIGURES 17 and 18) are made through a first set of grooves of a first roughing stand, then a third pass III (FIGURE 19) is made after turning the beam blanks 180°. Between each pass the rolls are approached in order to obtain the desired web thickness.

Then the beam blank is introduced into another groove as shown diagrammatically in FIGURE 16, to make the fourth and fifth passes (IV and V, FIGURES 20 and 21), after turning the beam blank 180°. After that, the beam blank is introduced into a third groove (pass VI, FIGURE 22) and the beam blank is again turned 180° and another pass being made in the same groove, after a proper setting of the rolls (pass VII, FIGURE 23).

Figure 24:
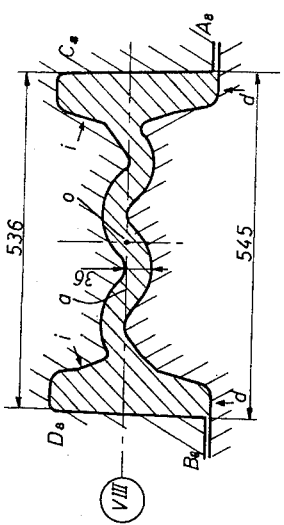
Figure 25:
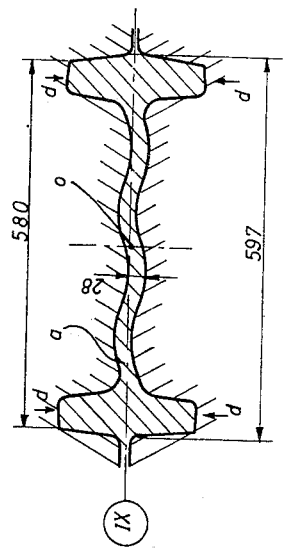

Finally, the beam blank is transported to another roughing stand in which the joints alternate with each other, as shown in FIGURES 24 and 26, to respect the rules of the conventional roll design. The beam corrugations are gradually reduced by passing through three successive sets of grooves (pass VIII, FIGURE 24, pass IX, FIGURE 25 and pass X, FIGURE 26) to obtain the final rough beam having either a slightly corrugated web (FIGURE 26), or a straight web, according to the space afforded by the roll barrel length.

The rolling operation is subsequently completed in the finishing stands (not shown) to obtain the desired final shape.

It will be readily understood by anybody conversant with the art that the dimensions shown in the drawings are given by way of example only and should not be construed as limiting the present invention.

What I claim is:

1. A method of roughing structural beams of great depth, comprising the steps of passing the pre-shaped beam through pairs of rolls forming corrugated grooves therebetween, the contour of said corrugated grooves being symmetrical in relation to the axis consisting of the point of intersection of the horizontal median plane of the beam, at right angles to the flanges, with the vertical median plane at right angles to the web, whereby the lateral thrusts are balanced while avoiding undesired over-rolling effects.

2. A method as set forth in claim 1, wherein the beam to be roughed is passed several times through the same grooves, the rolls being gradually approached between two successive passes.

3. A method as set forth in claim 1, wherein the beam to be roughed is turned 180° between two or more passes.

4. A method as set forth in claim 1, wherein the beam to be roughed is passed several times through the same grooves, the rolls being gradually approached between two successive passes, said beam being turned 180° between two or more passes.

5. A method as set forth in claim 4, wherein said beam turning step is performed as a single operation by using a member adapted to be lifted and comprising two catches so disposed as to cause the beam to be firstly raised and turned 90° by the first catch and then pivoted again 90° by the second catch to another position, whereby the beam is turned 180° from its initial position.

References Cited

UNITED STATES PATENTS 1,814,593    7/1931    Gersman _____ 72—234

CHARLES W. LANHAM, Primary Examiner

LOWELL A. LARSON, Assistant Examiner

U.S. Cl. X.R.

72—234, 366